(12) United States Patent
Lee et al.

(10) Patent No.: US 12,691,834 B2
(45) Date of Patent: Jul. 28, 2026

(54) RETROREFLECTIVE PIPING SHEET FOR VEHICLE INTERIOR DECORATION AND MANUFACTURING METHOD THEREOF

(71) Applicants: HYUNDAI MOTOR COMPANY, Seoul (KR); Kia Corporation, Seoul (KR); HJ CORP., Hwaseong-si (KR)

(72) Inventors: Hye Min Lee, Suwon-si (KR); Se Won Yoon, Suwon-si (KR); Ki Baek Yoon, Suwon-si (KR)

(73) Assignees: HYUNDAI MOTOR COMPANY, Seoul (KR); Kia Corporation, Seoul (KR); HJ CORP., Hwaseong-si (KR)

( * ) Notice: Subject to any disclaimer, the term of this patent is extended or adjusted under 35 U.S.C. 154(b) by 710 days.

(21) Appl. No.: 18/078,844

(22) Filed: Dec. 9, 2022

(65) Prior Publication Data

US 2023/0356671 A1     Nov. 9, 2023

(30) Foreign Application Priority Data

May 9, 2022    (KR) ........................ 10-2022-0056377

(51) Int. Cl.
   B60R 13/02        (2006.01)
   G02B 5/128        (2006.01)

(52) U.S. Cl.
   CPC .............. B60R 13/02 (2013.01); G02B 5/128 (2013.01)

(58) Field of Classification Search
   CPC ................................ B60R 13/02; G02B 5/128
   See application file for complete search history.

(56) References Cited

U.S. PATENT DOCUMENTS 5,055,347 A * 10/1991 Bacon, Jr. ............. B60C 13/001
                                                      442/295

FOREIGN PATENT DOCUMENTS

KR          10-0970320 B1      7/2010

* cited by examiner

*Primary Examiner* — Catherine A. Simone
(74) *Attorney, Agent, or Firm* — Morgan, Lewis & Bockius LLP

(57)          ABSTRACT

A retroreflective piping sheet for vehicle interior decoration includes a fabric layer having a fabric circular-knitted from a ply yarn of polyester and spandex, a retroreflective layer, disposed on a one side of the fabric layer, having a plurality of glass beads therein and a hot melt adhesive layer disposed on the other side side, opposite to the one side, of the fabric layer.

7 Claims, 2 Drawing Sheets

[FIG. 1]
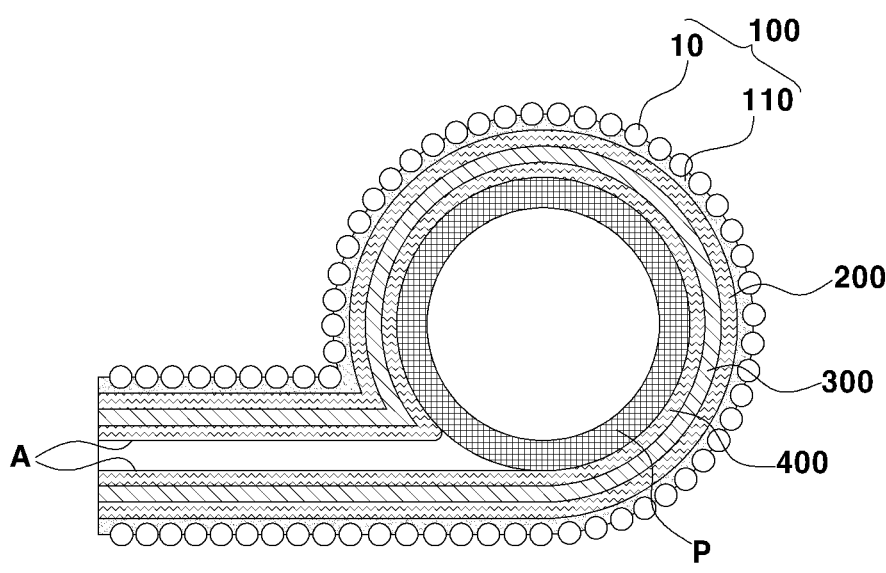
[FIG. 2]
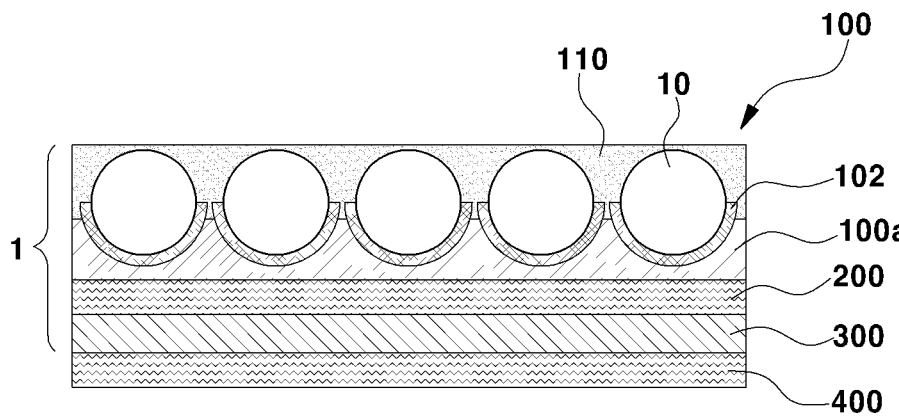

[FIG. 3]
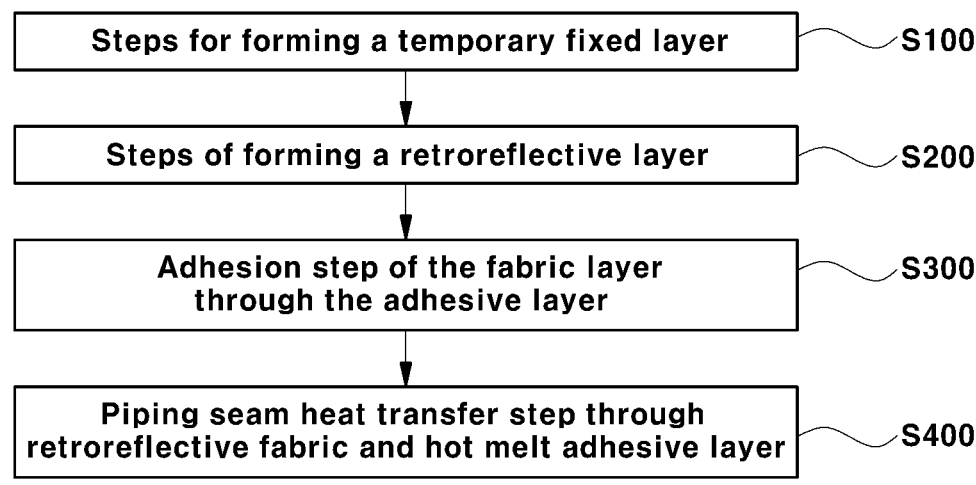
| | |
|---|---|
| Steps for forming a temporary fixed layer | S100 |
| Steps of forming a retroreflective layer | S200 |
| Adhesion step of the fabric layer through the adhesive layer | S300 |
| Piping seam heat transfer step through retroreflective fabric and hot melt adhesive layer | S400 |
[FIG. 4]
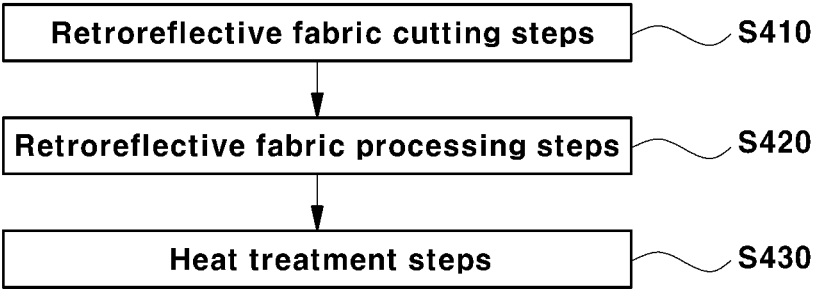
| | |
|---|---|
| Retroreflective fabric cutting steps | S410 |
| Retroreflective fabric processing steps | S420 |
| Heat treatment steps | S430 |

RETROREFLECTIVE PIPING SHEET FOR VEHICLE INTERIOR DECORATION AND MANUFACTURING METHOD THEREOF

CROSS REFERENCE TO RELATED APPLICATION

The present application claims priority to Korean Patent Application No. 10-2022-0056377, filed May 9, 2022 in the Korean Intellectual Property Office, the entire contents of which is incorporated herein for all purposes by this reference.

TECHNICAL FIELD

The present disclosure relates to a retroreflective piping sheet for vehicle interior decoration and a manufacturing method thereof. More particularly, the present disclosure relates to a retroreflective piping sheet for vehicle interior decoration, which can improve the marketability of vehicle interior materials by giving a retroreflective function, and a manufacturing method thereof.

Background In general, a decorative band formed of fabric has a colorful decorative function by allowing various colors and designs to be produced, but most of the decorative band is provided in the form of a flat ribbon. There is no volume due to characteristics thereof and no fixing force for the shape, and thus the usable object is limited to be mainly used only for clothing or accessories.

In addition, since most of the decorative bands described above are made of a single layer, there is a disadvantage in that they are not robust and are easily damaged by friction with the outside.

Accordingly, since the decorative bands are impossible to use for items requiring rigidity and three-dimensional effect such as automobile seats, sofas, and bags, so decorative bands, such as leather or synthetic leather, are typically made of materials that can be sewn to have a strong and shape-fixing power. However, not only the cost of the material itself is high, but the production cost is high due to difficulties in processing and sewing, and it is difficult to produce various colors and designs, so the colorful decorative elements are weak.

Therefore, in recent years, consumers who demand colorful decorative functions through the production of flashy and new designs, as well as low purchase prices, cannot satisfy their needs.

In addition, in the case of such a decorative band, when applied as an article, there is a disadvantage in that the occurrence of defects in the product increases due to the difficulty of sewing to impart a three-dimensional effect.

SUMMARY

An objective of the present disclosure is to provide a retroreflective piping sheet for vehicle interior decoration and a manufacturing method thereof, in which a retroreflective fabric is manufactured by sequentially bonding a retroreflective layer, an adhesive layer, and a fabric layer, and after placing a piping seam in the center of the retroreflective fabric cut with a plurality of sawtooth-shaped bends, heat is applied along the seam allowance line to process the retroreflective piping sheet by thermal transfer using a hot melt adhesive layer formed on the retroreflective fabric. By processing the retroreflective piping sheet, appearance quality and durability are improved when applied to the sheet cover for sewing.

The retroreflective piping sheet for vehicle interior decoration, according to an embodiment of the present disclosure, includes: a fabric layer having a fabric circular-knitted from a ply yarn of polyester and spandex; a retroreflective layer, disposed on one side of the fabric layer, having a plurality of glass beads therein; and a hot melt adhesive layer disposed on the other side, opposite the one side, of the fabric layer.

In addition, an adhesive layer applied with a synthetic adhesive resin is further provided between the fabric layer and the retroreflective layer.

In addition, the hot melt adhesive layer, together with a retroreflective fabric comprising the fabric layer, the adhesive layer, and the retroreflective layer, is configured to wrap, and be bonded to, a piping core.

Here, each of the plurality of glass beads is formed in a spherical shape having a size of about 30 to 100 μm and a refractive index of about 1.9 to 1.93.

The plurality of glass beads in the retroreflective layer are vacuum-deposited with a metal comprising one of Al, Ag, Cu, Zn and Sn.

In addition, the adhesive layer is applied with a polyurethane adhesive and contains about 15% to 30% of a phosphorus-based or bromine-based flame retardant resin.

In addition, the fabric layer comprises about 70% to 90% polyester yarn and 10% to 30% spandex yarn and has a thickness of about 0.3 to 0.5 mm.

In addition, the retroreflective fabric has a thickness of about 0.3 to 0.7 mm and a tear strength of about 2 kgf or more, and an elongation at break of about 150% to 500%.

In addition, the hot melt adhesive layer is configured to heat transfer the retroreflective fabric to the piping core, and have a polyester or polyurethane-based adhesive.

A manufacturing method of a retroreflective piping sheet for vehicle interior decoration, according to another embodiment of the present disclosure, includes: forming a temporary fixing layer by applying a thermoplastic resin to a carrier film; forming a retroreflective layer by aligning and fixing a plurality of glass beads on the temporary fixing layer and depositing a metal having light reflection properties on the plurality of glass beads; forming a fabric layer, having a fabric circular knitted from a ply yarn of polyester and spandex, on the retroreflective layer with an adhesive layer applied therebetween, thus forming a retroreflective fabric; and applying a hot melt adhesive layer on the retroreflective fabric and then wrapping a piping core with the retroreflective fabric and bonding the piping core thereonto with a high-frequency fusion.

Here, the applying the hot melt adhesive layer comprises: cutting the retroreflective fabric such that the retroreflective fabric has a width of about 20 to 30 mm; cutting, further, both sides of the retroreflective fabric into a saw-toothed shape; and high frequency heat-treating the retroreflective fabric along a seam line formed thereon with both sides thereof having the saw-toothed shape overlapped and aligned, thereby heat-transferring the retroreflective fabric to the piping core.

Here, the high frequency heat-treating is performed with a heat of about 150° C. to 180° C. along the seam line.

In the present disclosure, a retroreflective fabric is manufactured by sequentially bonding a retroreflective layer, an adhesive layer, and a fabric layer, and after placing a piping seam in the center of the retroreflective fabric cut with a plurality of sawtooth-shaped bends, heat is applied along the seam allowance line to process the retroreflective piping sheet by thermal transfer using a hot melt adhesive layer formed on the retroreflective fabric. By processing the retroreflective piping sheet, the sheet is applied to the sheet cover for sewing, thereby improving appearance quality and durability.

In addition, the present disclosure has the effect of satisfying vehicle safety laws related to flame retardancy by including flame retardant resin in the adhesive layer, or when a flame retardant is not included in the adhesive layer, by including a flame retardant yarn containing a flame retardant in the fabric layer.

BRIEF DESCRIPTION OF THE DRAWINGS

FIG. 1 is a view schematically showing a retroreflective piping sheet for vehicle interior decoration according to an embodiment of the present disclosure;

FIG. 2 is a view showing a retroreflective fabric of a retroreflective piping sheet for vehicle interior decoration according to an embodiment of the present disclosure;

FIG. 3 is a view for sequentially showing a manufacturing method of a retroreflective piping sheet for vehicle interior decoration according to another embodiment of the present disclosure; and FIG. 4 is a view showing a fourth step included in a manufacturing method of a retroreflective piping sheet for vehicle interior decoration according to another embodiment of the present disclosure.

DESCRIPTION OF THE PREFERRED EMBODIMENTS

Hereinafter, preferred embodiments according to the present disclosure will be described in detail with reference to the accompanying drawings.

Advantages and features of the present disclosure, and a method for achieving the same, will become apparent with reference to the embodiments described below in detail in conjunction with the accompanying drawings.

However, the present disclosure is not limited to the embodiments disclosed below but will be implemented in a variety of different forms, and the present embodiments are provided to complete the disclosure of the present disclosure and to completely inform the scope of the present disclosure to those skilled in the art, and the present disclosure is only defined by the scope of the claims.

In addition, in the description of the present disclosure, if it is determined that related known technologies may obscure the gist of the present disclosure, a detailed description thereof will be omitted.

FIG. 1 is a view schematically showing a retroreflective piping sheet for vehicle interior decoration according to an embodiment of the present disclosure, and FIG. 2 is a view showing a retroreflective fabric of a retroreflective piping sheet for vehicle interior decoration, according to an embodiment, of the present disclosure.

As shown in FIGS. 1 and 2, the retroreflective piping sheet for vehicle interior decoration, according to this embodiment, includes a retroreflective layer 100, an adhesive layer 200, a fabric layer 300, and a hot melt adhesive layer 400.

The retroreflective layer 100 is formed by aligning a plurality of glass beads 10 through a temporary fixing layer 102 formed by applying a thermoplastic resin to the carrier film 100A and depositing a metal having light reflection properties.

That is, the retroreflective layer 100 is a reflective layer reflecting incident light and is formed by aligning and fixing a plurality of glass beads 10 on the carrier film 100a in a state in which a temporary fixing layer 102 including a polyethylene resin, a polyurethane resin, ethylene vinyl acetate, a copolymer resin, and the like, is applied.

Here, when the glass bead 10 has a silver color, a metal having light reflection properties such as Al, Ag, Cu, Zn, or Sn may be deposited by a method of vacuum deposition, chemical vapor deposition (CVD), or physical vapor deposition (PVD) to form the deposition layer 110, or in the case of the colored glass beads 10, a colored pigment of the corresponding color may be applied to form the colored layer 110.

In addition, preferably, the glass bead 10 aligned with the retroreflective layer 100 has a spherical shape having a size of about 30 to 100 μm and is formed to have a refractive index of about 1.9 to 1.93.

As described above, when the glass bead 10 is uniformly aligned, and the aluminum (Al) deposition layer is formed, a retroreflection performance of about 300 to 700 cd/lux·m$^2$ (observation angle 0.2°, incident angle 5°) of the retroreflective layer 100 may be implemented, and if the refractive index is out of the range of about 1.9 to 1.93, the retroreflection performance does not exceed 300 cd/lux·m$^2$ (observation angle 0.2°, incidence angle 5°), and thus the retroreflection performance may be relatively degraded.

An adhesive layer 200 is formed by applying a synthetic adhesive resin to the retroreflective layer 100.

The adhesive layer 200 may be preferably formed of a polyethylene ether (PTMG)-based polyurethane (PU) adhesive having excellent elasticity and reliability and may also include 15% to 30% of a phosphorus-based or bromine-based flame retardant resin.

The fabric layer 300 is to be formed on the adhesive layer 200 and may preferably be made of a circular knit of polyester and spandex twisted yarn.

That is, the fabric layer 300 may be a circular knit of polyester and spandex twisted yarn having excellent elasticity and mechanical strength and preferably contains 70% to 90% of polyester yarn and about 10% to 30% of spandex yarn.

The fabric layer 300 is a factor that affects the appearance quality, and when a non-woven fabric is used in the fabric layer, the problems of reduced durability and excessive wrinkles may occur due to lack of adhesion with the retroreflective layer 100, when fabrics, tricots, etc., is used to the fabric layer, the sewing and assembly to be applied to seats in the vehicle interior may be broken and/or cause excessive wrinkles, so preferably a fabric with spandex should be used. More preferably, as described above, a circular knit of 70% to 90% polyester yarn and 10% to 30% spandex yarn may be used.

The fabric layer 300 may selectively contain about 10% to 30% of the flame retardant yarn containing phosphorus-based flame retardant, and if the adhesive layer 200 does not include a phosphorus-based flame retardant resin, as described above, the fabric layer 300 may selectively contain a flame retardant.

As described above, when the retroreflective fabric 1 is completed by sequentially laminating the retroreflective layer 100, the adhesive layer 200, and the fabric layer 300, as shown in FIG. 2, the retroreflective fabric has a thickness of 0.3 to 0.7 mm, a tear strength of about 2 kgf or more, and about 150% to 500% of elongation at break.

This is because if the thickness of the retroreflective fabric 1 is less than 0.3 mm, a problem that the strength becomes relatively weak may occur, and if the thickness of the retroreflective fabric exceeds about 0.7 mm, a problem of poor appearance quality may occur, so the thickness of the retroreflective fabric 1 may preferably be of about 0.3 to 0.7 mm.

When the tear strength of the retroreflective fabric 1 is less than 2 kgf, tearing may occur during sewing and assembly for application to the seat inside the vehicle, and when the retroreflective fabric 1 has an elongation at break of less than 150%, wrinkles may occur, and when the elongation at break of the retroreflective fabric 1 exceeds about 500%, processing may not be possible in the piping seam P due to its rigidity.

After all, when the retroreflective fabric 1 has a thickness of about 0.3 to 0.7 mm and has a physical property with a tear strength of about 2 kgf or more and elongation at the break of about 150% to 500%, the retroreflective fabric may be preferable in terms of ensuring assembly, appearance quality, etc.

On the other hand, the hot melt adhesive layer 400 is formed on the fabric layer 300, and as heat transfer is performed through high-frequency fusion, the retroreflective fabric 1 composed of the retroreflective layer 100, the adhesive layer 200, and the fabric layer 300, wraps and adheres to the piping shim P.

That is, the hot melt adhesive layer 400 corresponds to a means for thermally transferring the retroreflective fabric 1 to the piping seam P, and a polyester (PET) or polyurethane (PU)-based adhesive may be applied.

In other words, the hot melt adhesive layer 400 is a layer that adheres the facing surfaces A (see FIG. 1) to contact each other when the pipe seam P is surrounded by high-frequency fusion through the retroreflective fabric 1. This is to effectively adhere to the surface A facing each other through the hot melt adhesive layer 400 since the occurrence of pipe peeling may not be prevented only by high-frequency fusion without an adhesive.

Here, in order to transfer heat to the piping seam P by high-frequency fusion, it is preferable to apply heat at a high frequency of about 150° C. to 180° C. This is because, if the temperature is less than about 150° C., the adhesive strength to the surface (A) facing each other may be degraded due to low adhesive strength and peel off, and if the temperature is higher than about 180° C., the retroreflective layer 100 may be damaged.

Hereinafter, the present disclosure will be described in more detail with reference to Examples and Comparative Examples in order to describe the present disclosure in detail, but the present disclosure is not limited by these Examples and Comparative Examples. Embodiments, according to the present disclosure, may be modified in various other forms, and the scope of the present disclosure should not be construed as being limited to the embodiments described below. The embodiments of the present disclosure are provided to more completely explain the present disclosure to those of ordinary skilled in the art.

EXAMPLES AND COMPARATIVE EXAMPLES

Abrasion resistance (limit durability) was measured using a Hakjin-type tester according to the specifications for auxiliary materials sheets, and the number of times of abrasion at the point of damage after abrasion was measured for a load of 1 kg. Elongation at break was measured with a tensile speed of 200 mm/min. and an intermark distance of 100 mm according to the standard test method specification of leather, artificial leather, and sheet, and the tear strength was measured as the average value of the maximum value of the load at the time of operation at a tensile speed of about 200 mm/min., about 50 mm after cutting, and about 100 mm tear according to the standard test method specifications for leather, artificial leather, and sheet. The flame retardancy was measured at the rate of combustion per minute with a horizontal flammability tester according to the internal material flammability standard. The assembly was used as a representative example to cut and sew automobile seat parts, and when covering the seat parts, it was evaluated whether they could be sewn and whether product damage and tear after assembly. Appearance quality was evaluated with the naked eye, which is related to commercial properties, such as wrinkles and exterior scratches on curved parts after assembly was completed.

EXAMPLE

The retroreflective fabric 1 is completed by bonding an adhesive layer 200 containing a flame retardant, a fabric layer 300 made of a circular knit of polyester and spandex twisted yarn, and the hot melt adhesive layer 400 was formed on the retroreflective fabric 1. It was confirmed that the retroreflective fabric had 500 times abrasion resistance (limit durability), 250% of elongation at break, 1.7 kgf of tear strength, and flame retardant of self-extinguished (S.E), assembly, and no curved wrinkles with respect to appearance quality.

TABLE 1

| Division | Composition | | | Physical properties according to composition | | | | | |
| | Adhesive agent | Fabric | Hot melt Adhesive agent | Abrasion resistance (Limit durability) | Elongation at break [%] | Tear strength | Flame retardancy | Assembly | Appearance quality |
| --- | --- | --- | --- | --- | --- | --- | --- | --- | --- |
| Target performance | | | | 300 times or more | 150 to 500% | 1 kgf or more | 80 mm/min Below | OK | OK (Wrinkle X at the bend part) |
| Comparative Example 1 | Flame Retardancy O | Spandex (Poly/cotton) | Presence | 500 times | 225% | 1.1 kgf | S.E. | OK | OK (Wrinkle X at the bend part) |
| Comparative | Flame Retar- | Spandex (Poly/ | Presence | 500 times | 243% | 1.1 kgf | 85 mm/min | OK | OK (Wrinkle |

TABLE 1-continued

| | Composition | | | Physical properties according to composition | | | | | |
|---|---|---|---|---|---|---|---|---|---|
| Division | Adhesive agent | Fabric | Hot melt Adhesive agent | Abrasion resistance (Limit durability) | Elongation at break [%] | Tear strength | Flame retardancy | Assembly | Appearance quality |
| Example 2 | dancy X | cotton) | | | | | | | X at the bend part) |
| Comparative Example 3 | Flame Retardancy O | Non-woven fabric | Absence | 50 times | 120% | 1.1 kgf | S.E. | OK | NG (Excessive wrinkles) |
| Comparative Example 4 | Flame Retardancy O | Tricot (Poly/cotton) | Presence | 400 times | 95% | 0.5 kgf | S.E. | Tearing piping | (Cannot work) |
| Comparative Example 5 | Flame Retardancy O | Textile (Poly/cotton) | Presence | 450 times | 80% | 0.8 kgf | S.E. | OK | NG (Excessive wrinkles) |
| Comparative Example 6 | Flame Retardancy O | Knit (Spandex) | Presence | 500 times | 250% | 1.7 kgf | S.E. | OK | OK |
| Comparative Example 7 | Flame Retardancy O | Knit (Spandex) | Absence | 500 times | 264% | 1.6 kgf | S.E. | Piping peeling | (Cannot work) |

As shown in Table 1, through comparative examples 1 and 2, whether or not the automobile safety regulations are satisfied through the flame retardancy according to whether the flame retardant resin is included in the adhesive layer 200 for bonding the retroreflective layer 100 and the fabric layer 300 can be checked.

In the fabric layer 300 forming the retroreflective fabric 1 through Comparative Examples 3 to 6 of Table 1, when the non-woven fabric is included, insufficient durability and excessive wrinkle can be confirmed due to a lack of adhesion with the retroreflective layer 100, and in the case of tricots and fabrics, when sewing for assembly, it can be broken and work impossible, or excessive wrinkles can be checked. However, in the case of circular knits containing spandex, satisfactory results can be confirmed in terms of assembly and appearance quality.

In addition, in the heat transfer of the retroreflective fabric 1 to the piping seam P through Comparative Examples 6 and 7 in Table 1, as a result of checking the occurrence of peeling during assembly, depending on the presence or absence of the hot melt adhesive layer 400, when the hot melt adhesive layer 400 is not included, the surfaces A facing each other of the retroreflective fabric 1 are peeled off.

After all, in this embodiment, the retroreflective fabric 1 is completed by sequentially bonding the retroreflective layer 100, the adhesive layer 200 containing the flame retardant resin, and the fabric layer 300 containing the spandex fabric, and the retroreflective fabric 1 to make the processing of the retroreflective piping sheet by heat transfer through the hot melt adhesive layer 400, so that when applied for sewing to the seat cover, it is possible to improve the appearance quality and durability, and to include the flame retardant resin in the adhesive layer 200, it is possible to satisfy the vehicle safety regulations related to flame retardancy.

Hereinafter, FIG. 3 is a view sequentially showing a method of manufacturing a retroreflective piping sheet for interior decoration of a vehicle according to another embodiment of the present disclosure, and FIG. 4 is a view showing a fourth step included in a manufacturing method of a retroreflective piping sheet for vehicle interior decoration according to another embodiment of the present disclosure.

Based on the configuration of the above-described embodiment, with reference to FIG. 3, a manufacturing method of a retroreflective piping sheet for vehicle interior decoration, according to the present embodiment, will be sequentially described as follows.

A thermoplastic resin is applied to the carrier film 100a to form the temporary fixing layer 102 (S100).

A plurality of glass beads 1 are applied to the temporary fixing layer 102 to be aligned and fixed, and a deposition layer 110 on which a metal having light reflection properties is deposited, or the colored layer 110 coated with the colored pigment of the corresponding color is formed according to the colored glass bead 10 so that the retroreflective layer 100 is completed (S200).

After that, a fabric layer 300 made of a circular knit of 70% to 90% polyester yarn and 10% to 30% spandex yarn is formed on the retroreflective layer 100 using the adhesive layer 200, and by forming the hot melt adhesive layer 400, the retroreflective fabric 1 is completed (S300).

Finally, in a state in which the piping seam P is positioned in the center of the retroreflective fabric 1, including the hot melt adhesive layer 400, heat transfer is performed through high-frequency fusion to prepare a retroreflective piping sheet (S400).

Here, for the heat transfer of the retroreflective fabric 1 to the piping seam P through high-frequency fusion, at first, the retroreflective fabric is cut so as to have a width and length of 20 to 30 mm (S410).

In this state, both sides of the retroreflective fabric 1 are processed into a plurality of sawtooth shapes (S420) to prevent wrinkling from overlapping the piping on the curved portions.

For this purpose, preferably, the number of sawtooth shapes is processed into 10 to 12 per 5 cm along the longitudinal direction of the retroreflective fabric 1. This is because if the number of sawtooth shapes is more than this, the strength of the retroreflective fabric 1 is lowered, and it may be torn after sewing to a sheet, etc., if the number of sawtooth shapes is less than this, wrinkles may occur while the seam allowance line overlaps in the bent portion.

Then, the piping seam P is positioned at the inner center of the cut retroreflective fabric 1, and in a state where the retroreflective fabric 1 is folded, and both sides are overlapped in a sawtooth shape, a piping sheet is manufactured by applying heat at a high frequency along the seam allowance line formed on the retroreflective fabric 1 to transfer heat to the piping seam P (S430).

Here, in order to transfer heat to the piping seam P by high-frequency fusion, it is preferable to apply heat at a high frequency of 150° C. to 180° C. This is because, if the temperature is less than 150° C., the adhesive strength to the surface (A) facing each other may be degraded due to low adhesive strength and peel off, and if the temperature is higher than 180° C., the retroreflective layer 100 may be damaged.

In the present disclosure, a retroreflective fabric is manufactured by sequentially bonding a retroreflective layer, an adhesive layer, and a fabric layer, and after placing a piping seam in the center of the retroreflective fabric cut with a plurality of sawtooth-shaped bends, heat is applied along the seam allowance line to process the retroreflective piping sheet by thermal transfer using a hot melt adhesive layer formed on the retroreflective fabric. By processing the retroreflective piping sheet, the sheet is applied to the sheet cover for sewing, thereby improving appearance quality and durability.

In addition, the present disclosure has the effect of satisfying vehicle safety laws related to flame retardancy by including flame retardant resin in the adhesive layer, or when a flame retardant is not included in the adhesive layer, by including a flame retardant yarn containing a flame retardant in the fabric layer.

Although the present disclosure has been described with reference to the embodiment(s) shown in the drawings, this is merely exemplary, and it will be understood that various modifications may be performed therefrom, and all or part of the above-described embodiment(s) may be selectively combined. Accordingly, the true technical protection scope of the present disclosure should be defined by the technical spirit of the appended claims.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. As used herein, the term "about" means modifying, for example, lengths, degrees of errors, dimensions, the quantity of an ingredient in a composition, concentrations, volumes, process temperature, process time, yields, flow rates, pressures, and like values, and ranges thereof, refers to variation in the numerical quantity that may occur, for example, through typical measuring and handling procedures used for making compounds, compositions, concentrates or use formulations; through inadvertent error in these procedures; through differences in the manufacture, source, or purity of starting materials or ingredients used to carry out the methods; and like considerations. Whether modified by the term "about" the claims appended hereto include equivalents to these quantities. The term "about" further may refer to a range of values that are similar to the stated reference value. In certain embodiments, the term "about" refers to a range of values that fall within 10, 9, 8, 7, 6, 5, 4, 3, 2, 1 percent above or below the numerical value (except where such number would exceed 100% of a possible value or go below 0%) or a plus/minus manufacturing/measurement tolerance of the numerical value. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

What is claimed is:

1. A retroreflective piping sheet for vehicle interior decoration, the piping sheet comprising:
   a fabric layer having a fabric circular-knitted from a ply yarn of polyester and spandex;
   a retroreflective layer, disposed on one side of the fabric layer, having a plurality of glass beads therein;
   a hot melt adhesive layer disposed on the other side, opposite to the one side, of the fabric layer; and
   A an adhesive layer is provided between the fabric layer and the retroreflective layer,
   wherein the adhesive layer comprises a synthetic resin adhesive comprising a polyurethane adhesive and contains about 15% to 30% of a phosphorus-based or bromine-based flame retardant resin.

2. The piping sheet of claim 1, wherein the hot melt adhesive layer, together with a retroreflective fabric comprising the fabric layer, the adhesive layer, and the A retroreflective layer, is wrapped around, and bonded to, a piping core.

3. The piping sheet of claim 1, wherein each of the plurality of glass beads is formed in a spherical shape having a size of about 30 to 100 μm and a refractive index of about 1.9 to 1.93.

4. The piping sheet of claim 1, wherein the plurality of glass beads in the retroreflective layer are vacuum-deposited with a metal comprising one of Al, Ag, Cu, Zn and Sn.

5. A retroreflective piping sheet for vehicle interior decoration, the piping sheet comprising:
   a fabric layer having a fabric circular-knitted from a ply yarn of polyester and spandex;
   a retroreflective layer, disposed on one side of the fabric layer, having a plurality of glass beads therein; and
   a hot melt adhesive layer disposed on the other side, opposite to the one side, of the fabric layer,
   wherein the fabric layer comprises about 70% to 90% polyester yarn and about 10% to 30% spandex yarn and has a thickness of about 0.3 to 0.5 mm.

6. The piping sheet of claim 2, wherein the retroreflective fabric has a thickness of about 0.3 to 0.7 mm and a tear strength of about 2 kgf or more, and an elongation at break of about 150% to 500%.

7. The piping sheet of claim 2, wherein the hot melt adhesive layer comprises a polyester or polyurethane-based adhesive.

* * * * *